United States Patent [19]

Fujii

[11] Patent Number: 4,529,286
[45] Date of Patent: Jul. 16, 1985

[54] ATTACHMENT LENS SYSTEM FOR SINGLE-LENS REFLEX CAMERAS

[75] Inventor: Tōru Fujii, Hino, Japan

[73] Assignee: Olympus Optical Co., Ltd., Tokyo, Japan

[21] Appl. No.: 495,130

[22] Filed: May 16, 1983

[30] Foreign Application Priority Data

May 17, 1982 [JP] Japan .................................. 57-82739

[51] Int. Cl.³ .............................................. G02B 27/40
[52] U.S. Cl. .................................. 354/402; 354/409; 354/286; 350/409
[58] Field of Search ............... 354/406, 407, 409, 402, 354/286; 350/409

[56] References Cited

U.S. PATENT DOCUMENTS 4,104,650  8/1978  Hosoe et al. .................. 354/409 X
4,223,988  9/1980  Jyojiki et al. ...................... 354/407
4,382,665  5/1983  Eguchi et al. ...................... 354/409

FOREIGN PATENT DOCUMENTS 50-113228  9/1975  Japan .

Primary Examiner—L. T. Hix
Assistant Examiner—David M. Gray
Attorney, Agent, or Firm—Cushman, Darby & Cushman

[57] ABSTRACT

An attachment lens system for single-lens reflex cameras capable of being interposed between an ordinary interchangeable lens system and camera body and formed with a negative lens component, a beam splitter arranged at the image side of the negative lens component and a positive lens component arranged at the image side of the beam splitter, in order to enable the use of an ordinary interchangeable lens system as an interchangeable lens system provided with a focus detection optical system for auto-focus. The light from an object which has passed a master lens is divided by the beam splitter so as to be guided onto the film face or finder screen and to the focus detection means.

7 Claims, 5 Drawing Figures

ATTACHMENT LENS SYSTEM FOR SINGLE-LENS REFLEX CAMERAS

BACKGROUND OF THE INVENTION (a) Field of the Invention

The present invention relates to a lens system for single-lens reflex cameras, more particularly to an attachment lens system for single-lens reflex cameras so interposed between an ordinary interchangeable lens system and camera body that TTL auto-focus mechanism is able to be added to a single-lens reflex camera.

(b) Description of the Prior Art

Conventionally, as an auto-focus device for single-lens reflex cameras, a method in which the distance measurement is effected, using a so-called triangulation, by a distance measuring optical system different from a photographing lens system attached on the camera body and the focusing is effected by transmitting the distance information obtained thereby to the focus driver of photographing lens system is well known. However, in this method, because of the existence of parallax between the photographing lens system and distance measuring optical system, while an accurate focusing is able to be effected on a comparatively far object, it is easy to happen the distance measuring errors on a near object owing to the increase of the influence of parallax. And, as it is necessary that the base length for the distance measurement is to be long in some degree, there is a defect that the distance measuring optical system or lens system as a whole will be large. Further, as it is necessary that the photographing lens system and distance measuring optical system are interlocked as a set, it has a fatal defect that the auto-focus function is not obtainable in case a special interchangeable lens system provided with the distance measuring optical system for autofocus is not used.

SUMMARY OF THE INVENTION

The primary object of the present invention is, in order to delete the above-mentioned defects, to provide an attachment lens system for single-lens reflex cameras which enables an ordinary interchangeable lens system to be used as an interchangeable lens system provided with a focus detection optical system for auto-focus when interposed between the interchangeable photographing lens system and camera body.

Another object of the present invention is to provide an attachment lens system which does little affect the field angle of the photographing lens system or master lens attached on the camera body and does not spoil the function of the master lens.

A still another object of the present invention is, in order to elevate the focus detection accuracy, to provide an attachment lens system able to effect the focus detection with a bright object image.

A still another object of the present invention is to provide an attachment lens system so formed that the discrepancy between the focus position of the photographing lens system and focus position of the focus detection lens system which may happen because of the differences in the chromatic aberration and the like at the exchange of photographing lens system is able to be deleted.

A still another object of the present invention is to provide an attachment lens system able to indicate the focus information in the visual field of finder.

These and other objects of the present invention will become more apparent during the course of the following detailed description and appended claims.

DESCRIPTION OF THE PREFERRED EMBODIMENTS

Figure 1:
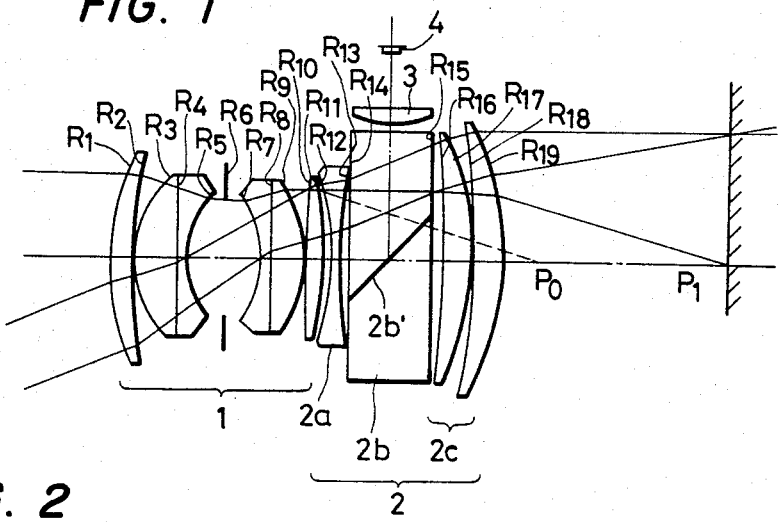
FIG. 1 is a view showing an example of the lens formation of the attachment lens system according to the present invention and the master lens system.

Referring to FIG. 1, the numerical reference 1 is an ordinary interchangeable lens system to be used as a master lens, and a far object is imaged at the position $P_0$ only by the lens system 1. 2 is an attachment lens system according to the present invention formed with a negative lens component 2a comprising at least one lens element (one element in the drawing), a prism 2b having a half-mirror 2b' and arranged at the image side thereof and a positive lens component 2c comprising at least one lens element (two elements in the drawing) arranged at the image side thereof and so arranged that the light bundle from the master lens system 1 is almost afocalized by the negative lens component 2a and divided by the half-mirror 2b' of the prism 2b or half-prism, the light bundle having passed through the half-mirror 2b' is imaged at the position $P_1$ and the light bundle reflected by the half-mirror 2b' is imaged on a focus detection element 4 through a relay lens 3.

As the embodiment according to the present invention is so formed as mentioned above, the light bundle to be used for the auto-focus is so divided that it is able to be guided out of the lens system and imaged on the focus detection element 4 only by inserting the attachment lens system behind the ordinary interchangeable lens system 1. Accordingly, the auto-focus mechanism is obtainable by so arranging that the focusing of the master lens system 1 is effected by a driving mechanism not illustrated upon the informations from the focus detection element 4.

By the way, the optical axis of the light bundle divided and guided out of the lens system for the use of the auto-focus is not needed to be perpendicular with the optical axis of the master lens system 1 and may be guided out of the lens system after totally reflecting it at the edge portion of the prism formed slopewise. Further, as the light bundle passing through the prism 2b is almost afocalized, the reflection character of the half-mirror 2b' is obtainable with an even state and the focusing adjustment of the relay lens 3 inserted in the light path for the auto-focus is very easy. Moreover, as the function of the master lens system 1 is not spoiled without receiving almost no influence on the field angle when almost the same magnification ratios are given to the negative lens component 2a and positive lens component 2c by making nearly equal the absolute values of the focal lengths of the negative lens component 2a and positive lens component 2c, it may be a telephoto attachment lens system by so forming that they have proper magnification ratios. It is needless to say that the negative lens component 2a and the positive lens component 2c may be lens components comprising respectively a plurality of cemented lens elements to control the occurance of chromatic aberration least possible, that an aspherical lens element may be used in the negative lens component and/or positive lens component to correct the curvature of field and distortion and that plastic lens elements may be introduced to reduce the manufacturing cost.

And, in the above embodiment, the relay lens 3 may be exactly same to the positive lens component 2c of the attachment lens system 2, but the image will be dark because of the use of the half-mirror 2b' or half-prism for the division of the light bundle. However, by setting the focal length of the relay lens 3 shorter than the focal length of the positive lens component 2c, the F-value of the relay lens 3 becomes substantially smaller and the focus detection will be effected with a brighter image, resulting in the increase of the detection accuracy. In this case, as the image forming magnification ratio is reduced while the image becomes brighter, it is necessary to select the focal length within the proper range and it is preferred that the image forming performance of the relay lens 3 is equal to that of the positive lens component.

Figure 2:
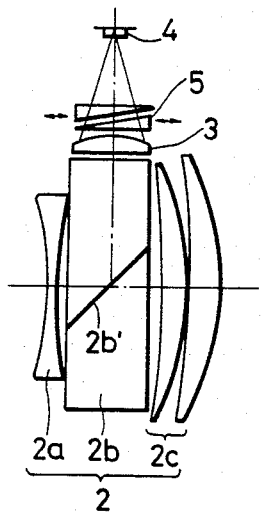
FIG. 2 is a view showing an attachment lens system provided with optical wedges.

In the attachment lens system shown in FIG. 2, optical wedges 5 are arranged at the side of the focus detection element 4 of the relay lens 3 and, thereby, the discrepancy between the focusing position of the photographing lens system and that of the focus detection optical system able to be caused by the differences in the chromatic aberration and the like when the master lens system is exchanged may be adjusted and made to coincide with each other.

Figure 3:
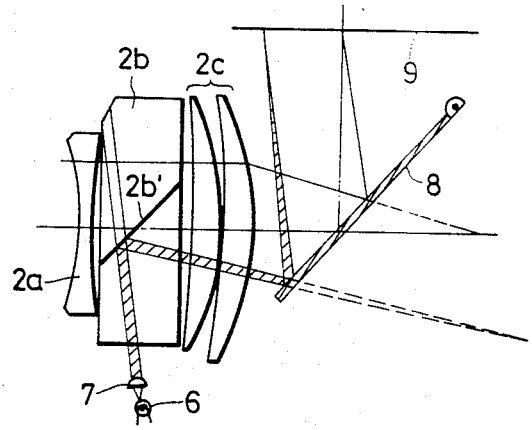
FIG. 3 is a view showing an attachment lens system having an illuminating optical system to perform the in-focus indication.

In the attachment optical system shown in FIG. 3, 6 is a light source operating in such a way that it lights on or off, changes the color or switches on and off alternatively the two light emitting points in correspondence with the in-focus and out-of-focus and the light bundle emitted from the light source 6 and paralleled by a lens element 7 is intended to be reflected by the half-mirror 2b', re-reflected by a quick-return mirror 8 inside the camera body through the positive lens component 2c and imaged on the finder screen 9. Therefore, it is possible to confirm the in-focus or out-of-focus on the finder screen 9 of single-lens reflex camera. By the way, it is preferable, at photographing, that the light source 6 is switched off in a proper mode, for example by so arranging the switch that it operates interlocking with the mechanical movement of the mirror 8 of the camera body side before it starts the operation, so that the lighting point by the light source 6 will not be imaged on the film.

The embodiment of the lens system according to the present invention adopts the Gauss-type lens system of 50 mm/F1.8 as the master lens and the lens system of the formation shown in FIG. 1 as the attachment lens system and has the following numerical data:

| | R | D | N | V |
|---|---|---|---|---|
| 1 | 33.7900 | 4.5000 | 1.78472 | 25.68 |
| 2 | 130.2830 | 0.1500 | 1.00000 | |
| 3 | 21.4580 | 6.5900 | 1.60311 | 60.70 |
| 4 | 349.3060 | 1.3000 | 1.78472 | 25.71 |

-continued

| | R | D | N | V |
|---|---|---|---|---|
| 5 | 14.9890 | 6.6000 | 1.00000 | |
| 6 | 9999.0000 | 6.4000 | 1.00000 | |
| 7 | −15.1340 | 1.6500 | 1.72875 | 28.46 |
| 8 | −490.5380 | 5.6000 | 1.80610 | 40.95 |
| 9 | −20.3160 | 0.1500 | 1.00000 | |
| 10 | 246.5770 | 3.2300 | 1.80610 | 40.95 |
| 11 | −48.6843 | 1.1310 | 1.00000 | |
| 12 | −39.3435 | 1.5000 | 1.78472 | 25.68 |
| 13 | 107.0696 | 1.3171 | 1.00000 | |
| 14 | 9999.0000 | 14.0000 | 1.51633 | 64.15 |
| 15 | 9999.0000 | 1.2000 | 1.00000 | |
| 16 | −301.8584 | 5.2000 | 1.77250 | 49.66 |
| 17 | −45.4806 | 0.1500 | 1.00000 | |
| 18 | −135.0260 | 5.0000 | 1.80610 | 40.95 |
| 19 | −46.1049 | | | |
| $f_1 = -36.5$ mm, | | | $f_2 = +36.5$ mm | | wherein, the reference symbol R denotes the radius of curvature of respective refracting surface, D denotes the thickness or air space of respective lens element, N denotes the refractive index of respective lens element, V denotes the Abbe's number of respective lens element, the surfaces 1 through 11 are of the master lens system of 50 mm/F1.8, 12 through 19 are of the attachment lens system according to the present invention, and 14 and 15 are of the prism. Further, $f_1$ denotes the focal length of the negative lens component of the surfaces 12 and 13 and $f_2$ denotes the synthetic focal length of the positive lens component of the surfaces 16 through 19, and, in this case, the magnification ratio of the attachment lens system is 1.07.

Figure 4:
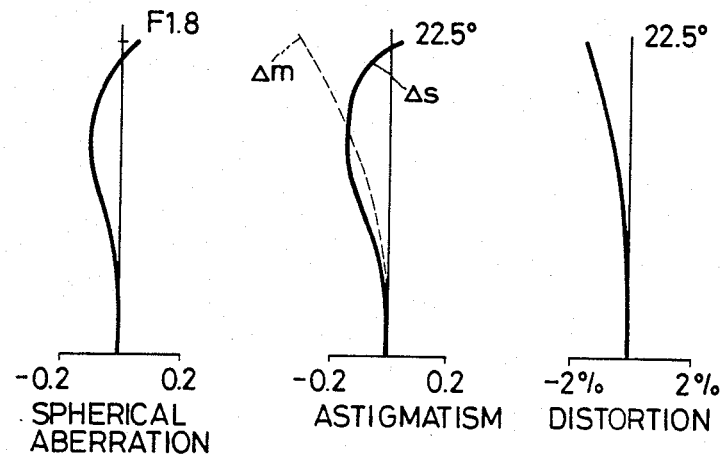
FIG. 4 is diagrams showing the aberration curves of an example of the master lens system.
Figure 5:
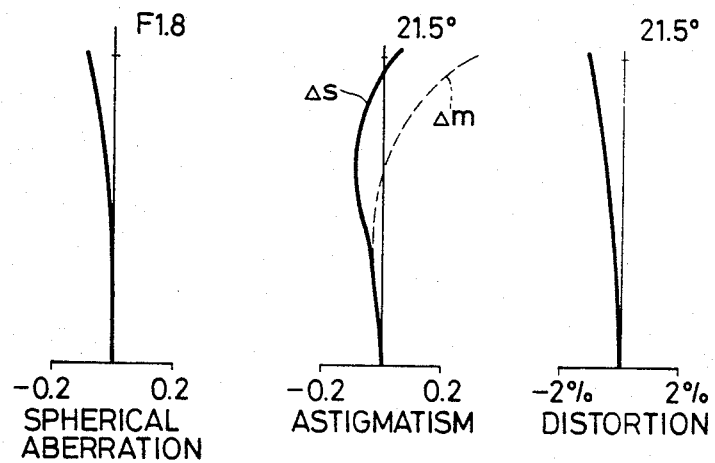
FIG. 5 is diagrams showing the aberration curves of the case in which the attachment lens system according to the present invention is attached on the master lens system of FIG. 4.

The respective aberrations of the above lens systems are as shown in FIGS. 4 and 5. FIG. 4 is showing the aberration curves of the master lens itself and FIG. 5 is showing the aberration curves of the whole optical system when the attachment lens system according to the present invention is attached to the master lens system.

By the way, in the above description, it is explained of the case of single-lens reflex camera, but the present invention, not limited to this, may be applied to optical instruments of a style in which the lens system is interchangeable.

I claim:

1. An attachment optical lens system for single-lens reflex cameras comprising a negative lens component arranged at the image side of an interchangeable master lens system to substantially constitute an afocal system with said master lens system, a beam splitter arranged at the image side of said negative lens component and able to direct the light bundle having passed said negative lens component onto one of a film face and finder screen and to a focus detection means, and a positive lens component arranged at the image side of said beam splitter and able to image the light bundle part having passed said beam splitter on one of said film face and finder screen.

2. An attachment optical lens system according to the claim 1, wherein the image forming magnification ratios of the light bundles passing through said negative lens component, beam splitter and positive lens component are substantially equal.

3. An attachment optical lens system according to the claim 1, wherein at least one of said negative lens component and positive lens component is an aspherical lens.

4. An attachment optical lens system according to the claim 1, further comprising a relay lens arranged in the light path of the light bundle divided by said beam splitter and directed to said focus detection means and said light bundle being guided to said focus detection means through said relay lens.

5. An attachment optical lens system according to the claim 4, wherein the focal length of said relay lens is shorter than the focal length of said positive lens component.

6. An attachment optical lens system according to the claim 4, further comprising optical wedges interposed between said relay lens and focus detection means.

7. An attachment optical lens system according to the claim 1, further comprising a light source means arranged near said beam splitter and able to be lighted on to indicate the focus information from said focus detection means in the visual field of finder but to be lighted off at photographing and a lens interposed between said light source and beam splitter and able to image the light bundle from said light source means on said finder screen through said beam splitter.

* * * * *